Figure 1:
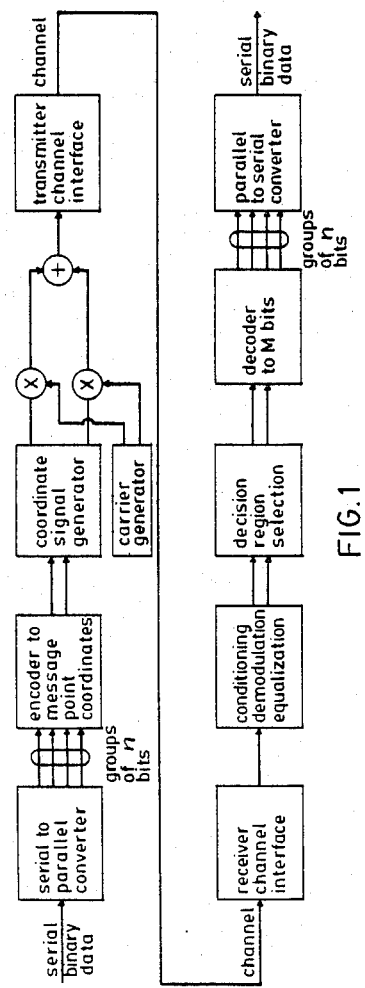

United States Patent [19]

Lang et al.

[11] Patent Number: 4,538,284

[45] Date of Patent: Aug. 27, 1985

[54] SIGNAL STRUCTURES WITH DATA ENCODING/DECODING FOR QCM MODULATIONS

[75] Inventors: Gordon R. Lang, Bolton, Canada; George D. Forney, Jr.; Shahid Qureshi, both of Mansfield, Mass.; Fred M. Longstaff, Islington; Chi H. Lee, Willowdale, both of Canada

[73] Assignee: ESE Limited, Rexdale, Canada

[21] Appl. No.: 352,207

[22] Filed: Feb. 25, 1982

[30] Foreign Application Priority Data

Mar. 25, 1981 [CA] Canada .................................. 373861

[51] Int. Cl.³ .............................................. H03C 5/00
[52] U.S. Cl. ...................................... 375/39; 375/42; 375/43; 329/135; 332/17
[58] Field of Search ...................................... 375/38-40, 375/42, 53; 370/84; 332/9 R, 11 R, 17, 23 A, 42; 329/104, 135

[56] References Cited

U.S. PATENT DOCUMENTS

| | | | |
|---|---|---|---|
| 3,805,191 | 4/1974 | Kawai et al. | 332/21 |
| 3,818,135 | 6/1974 | Tannhauser | 375/56 |
| 3,955,141 | 5/1976 | Lyon et al. | 375/39 |
| 3,982,077 | 9/1976 | Clark et al. | 370/84 |
| 3,988,539 | 10/1976 | Motley et al. | 375/39 X |
| 4,024,342 | 5/1977 | Croisier et al. | 375/39 |
| 4,035,767 | 7/1977 | Chen et al. | 375/56 |
| 4,495,477 | 1/1985 | Weber | 375/42 |

OTHER PUBLICATIONS

D. L. Lyon, "Practical Signal Space Coding for the Telephone Channel," Proceedings of the Nat. Electr. Conference, vol. 29, No. 29, Oct. 1974, pp. 290–294.

Marvin K. Simon and Joel G. Smith, "Hexagonal Multiple Phase-and-Amplitude-Shift-Keyed Signal Sets," IEEE Transactions on Communications, vol. 21, No. 10, Oct. 1973, pp. 1108–1115.

*Primary Examiner*—Robert L. Griffin
*Assistant Examiner*—Raymond C. Glenny
*Attorney, Agent, or Firm*—Westell & Hanley

[57] ABSTRACT

Locations of a desired number of signal points for a double side band-quadrature carrier modulation system occupy the inner intersections of a multiplicity of concentric rings with a triangular grid. The signal point locations of the desired number on the outer partially occupied ring are provided with additional signal points at positions selected to provide that the centroid of the set of locations is at the center of the rings.

31 Claims, 30 Drawing Figures

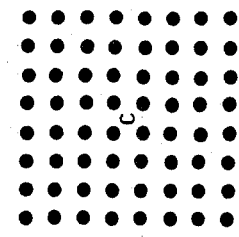
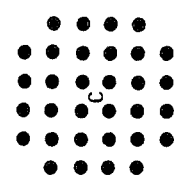
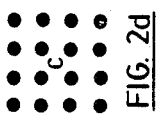
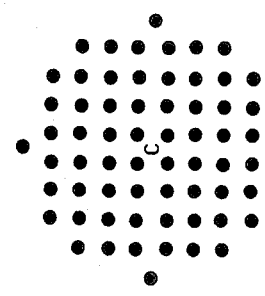
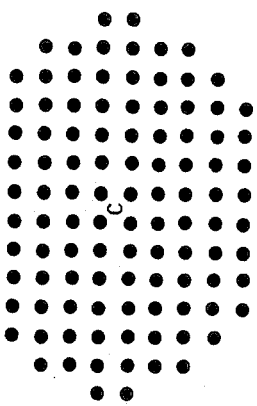
FIG. 2a FIG. 2b FIG. 2c FIG. 2d FIG. 2e FIG. 2f FIG. 2g FIG. 2h
PRIOR ART

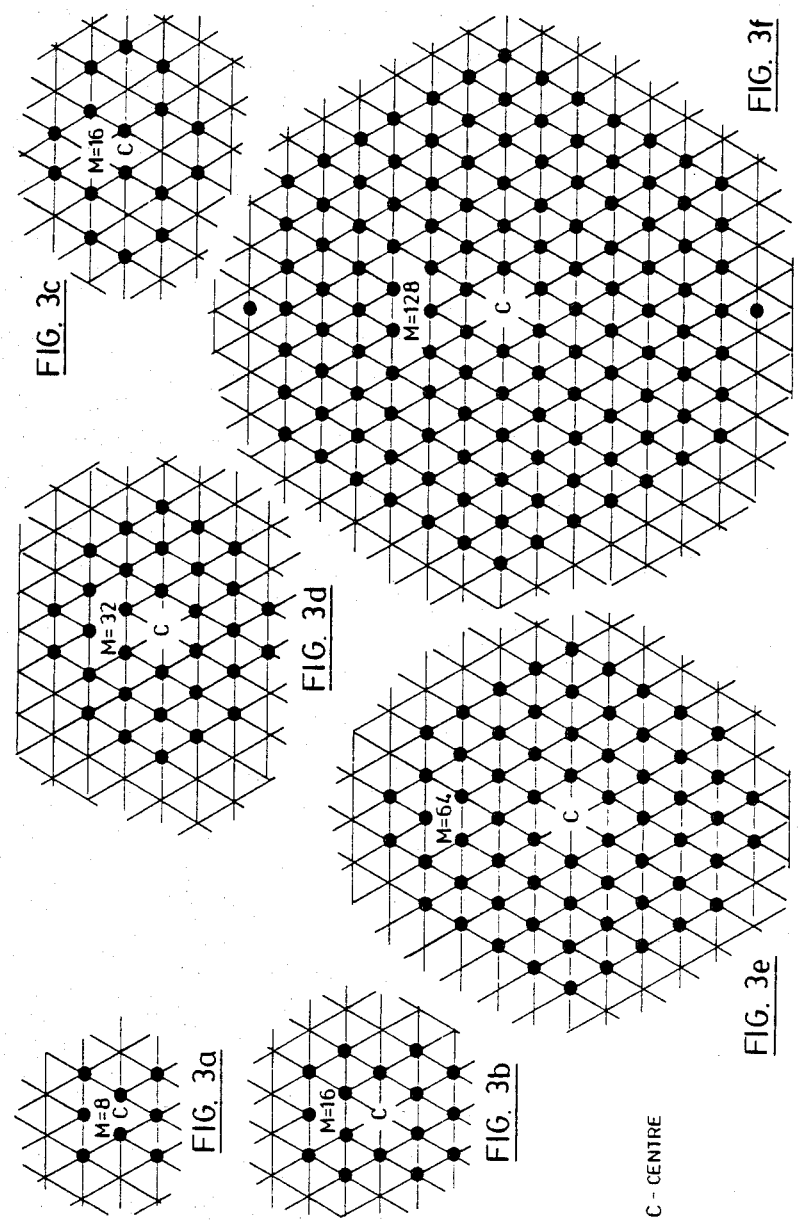

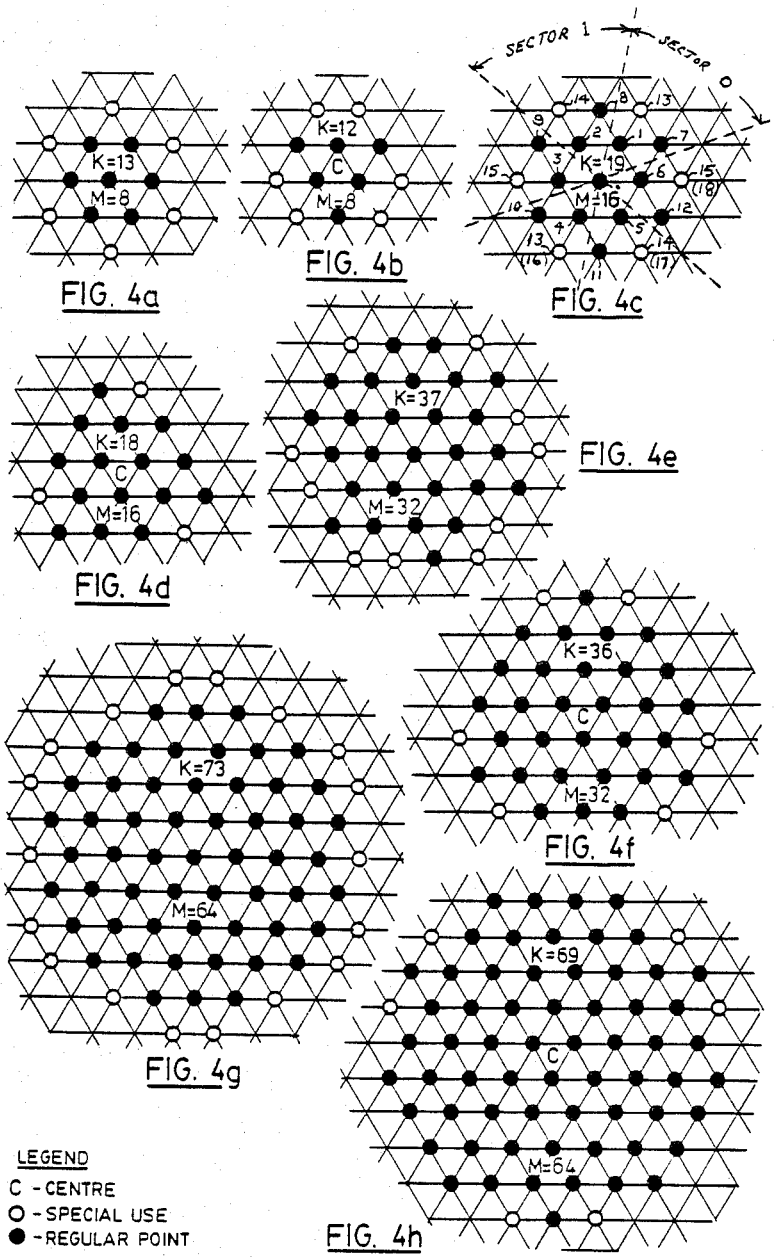

SIGNAL STRUCTURES WITH DATA ENCODING/DECODING FOR QCM MODULATIONS

This invention relates to quadrature carrier modulation communications systems.

Quadrature-carrier modulation (QCM) communications methods convey information as pairs of coordinate signals representing digital values, modulated on an "in phase" and on a "quadrature phase" carrier respectively.

At the transmitter a series of binary digital signals is transformed in sequential groups into pairs of coordinate signals which spatially represent in Cartesian coordinates of two dimensions a message point corresponding to the binary number value of such group. Such pairs of coordinate signals appear as modulations on the carriers. At the receiver the received modulated carrier signals are demodulated and the digital group identified from the demodulated received coordinate signals. During transmission over the network or channel, the transmitted modulated carrier is affected by noise and by many other influences well known to those skilled in the art. Correct detection of the received signals therefore involves determining, on a balance of probabilities, which of two or more message points is represented by the coordinate signals received.

The most common and best known of the signalling methods is double side band-quadrature carrier modulation (often abbreviated DSB-QCM). DSB-QCM includes modulation techniques such as phase-shift keying (PSK), quadrature amplitude modulation (QAM), and combined amplitude and phase modulation which have long been known in the art.

This invention is particularly suitable for use with DSB-QCM systems with the elements of the pairs of coordinates being sent on the quadrature and in phase carriers respectively.

Prior developments for signalling such pairs of coordinates include Canadian Pat. No. 985,376 which issued Mar. 9, 1976 to Codex Corporation and U.S. Pat. No. 3,955,141 which issued May 4, 1976 to Intertel Inc. Both such patents show signalling systems where the message points spatially representing the coordinate values display a square or rectilinear pattern and have four-fold symmetry.

However, it has been noted that message points arranged in hexagons show better performance with regard to Gaussian noise or phase jitter than the rectangular or four-fold symmetry of the prior patents referred to herein. A discussion of hexagonal systems is contained in an article entitled "Hexagonal Multiple Phase-and-Amplitude-Shift-Keyed Signals Sets" by Marvin K. Simon and Joel G. Smith, appearing in IEEE transactions on Communications Vol. COM-21, No. 10, Oct. 1973.

It is an object of this invention to provide apparatus and a method of signalling using pairs of coordinates modulated on in phase and quadrature phase carriers, where the message points represented by the coordinated pairs collectively form a hexagonal pattern arranged on the intersections of an equilateral triangular grid. In the inventive apparatus and method it will be understood that a series of binary signals, are encoded in groups of n binary signals requiring a minimum of $2^n$ message points defined by coordinate pairs. In accord with the invention there are made available, in the hexagonal pattern K message points, where $K > 2^n$. It will be noted that of the $2^n$ possible values for the group of a digits, some of such values will be in one-to-one correspondence with a corresponding number of the K message points. The remainder of such $2^n$ values will have 2 or more message points corresponding thereto. For $K > 2^n$ it is not necessary but it is certainly preferable if the points K are not only arranged in a hexagonal relationship to one another but are arranged with 120° and preferably 60° symmetry. Symmetry of any degree tends to reduce and preferably substantially eliminate the carrier component of the received signal. Further the higher degree of symmetry renders easier the decision and decoding process at the receiver, particularly when combined with differential encoding techniques. Moreover the power requirements of the communications system will be less if the hexagonally arranged signal points are packed as closely as possible to the origin or point corresponding to zero signal amplitude for both coordinates on a Cartesian coordinate system. That is, the hexagonally arranged message points may be considered to be located on concentric rings about the origin and where all available points on a ring (with the possible exception of several outer rings) are occupied. Although the extra $K - 2^n$ message points provide advantages independent of the symmetry and density of packing of the message points, the principal advantages of the invention accrue when the message points are symmetrically arranged about the origin and densely packed outward therefrom and the advantageous use of the $K - 2^n$ extra points will be principally discussed where such symmetry and dense packing are present.

The encoding and transmitting apparatus is preferably designed so that the inner message points relative to the origin are in one-to-one correspondence with the values of groups of n binary signals where 2 or more of the outer of the K message points correspond to others of the group values. In this way, there are a plurality of outer message points which are not used each time the corresponding binary value is to be transmitted, points in such plurality of outer message points may be used cyclically or in accord with another rule. In any event, the outer points are used with less frequency than the inner and power savings are thus achieved; since in a optimally designed system the energy required to signal when using the outer points in the pattern will be greater than when using the inner points. The alternate message points corresponding to a digital value of a group of binary digits may be used cyclically to improve the symmetry of the collective transmission of sequential message points. The fact that alternate points are available corresponding to some of the group values allows transmission of extra information since the method of selection of alternate points may be used for signalling. Thus in accord with a preferred arrangement of the invention a class of values comprising $K - 2$ $(K - 2^n)$ of the group values will be in one-to-one relationship with a corresponding number of the K message points but $K - 2^n$ of the group values will each have two alternate corresponding message points. This allows the transmission of binary information on a channel additional to that represented by the data conveyed by the groups of n digits. Thus the additional binary information will not be regularly transmitted but must be queued for transmission whenever one of the $K - 2^n$ values outside the class is to be transmitted. There are no practical limits to the type of binary information which may be sent on the additional channel thus provided. Thus the information transmitted on the additional channel may (for example) relate to the operation of the communications system, to the high speed transmission of the $2^n$ groups or it may be independent information.

It will be obvious that, while the advantages specified in the previous paragraph are easier to demonstrate where the hexagonally arranged points are densely packed about the origin and arranged in hexagonal or triangular symmetry, some of these advantages (namely the provision of an additional channel and low frequency use of some message points) also accure when the dense packing and symmetry are absent.

Moreover the present invention allows the provision of novel message point distributions, determined by the coordinates transmitted by QCM modulation which continue to exhibit near optimum margins against both Gaussian noise and phase jitter as additional points are added. Further advantages of the invention are that the apparatus and method allows suppression of carrier and provide 60° or 120° symmetry.

Figure 5:
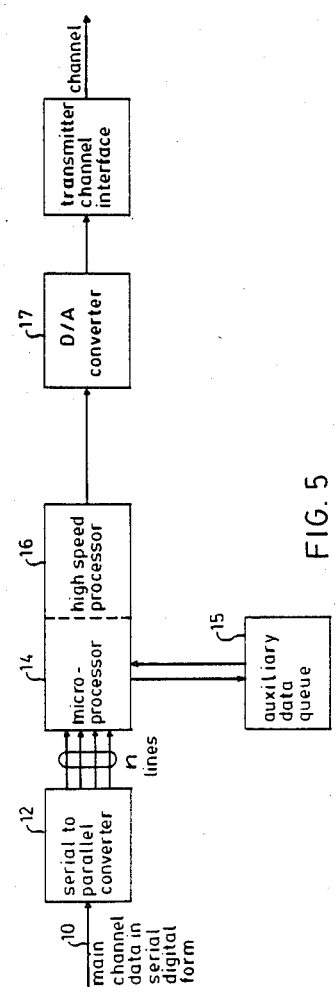
Figure 6:
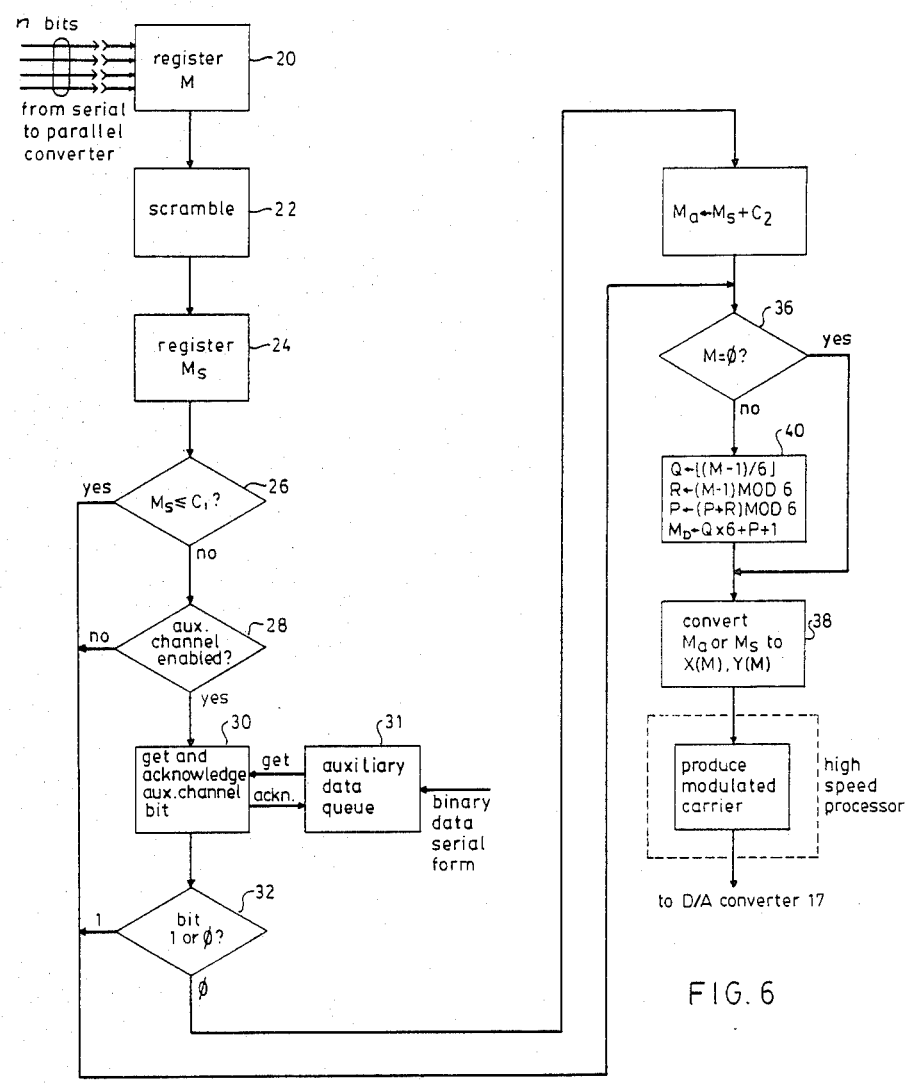
Figure 7:
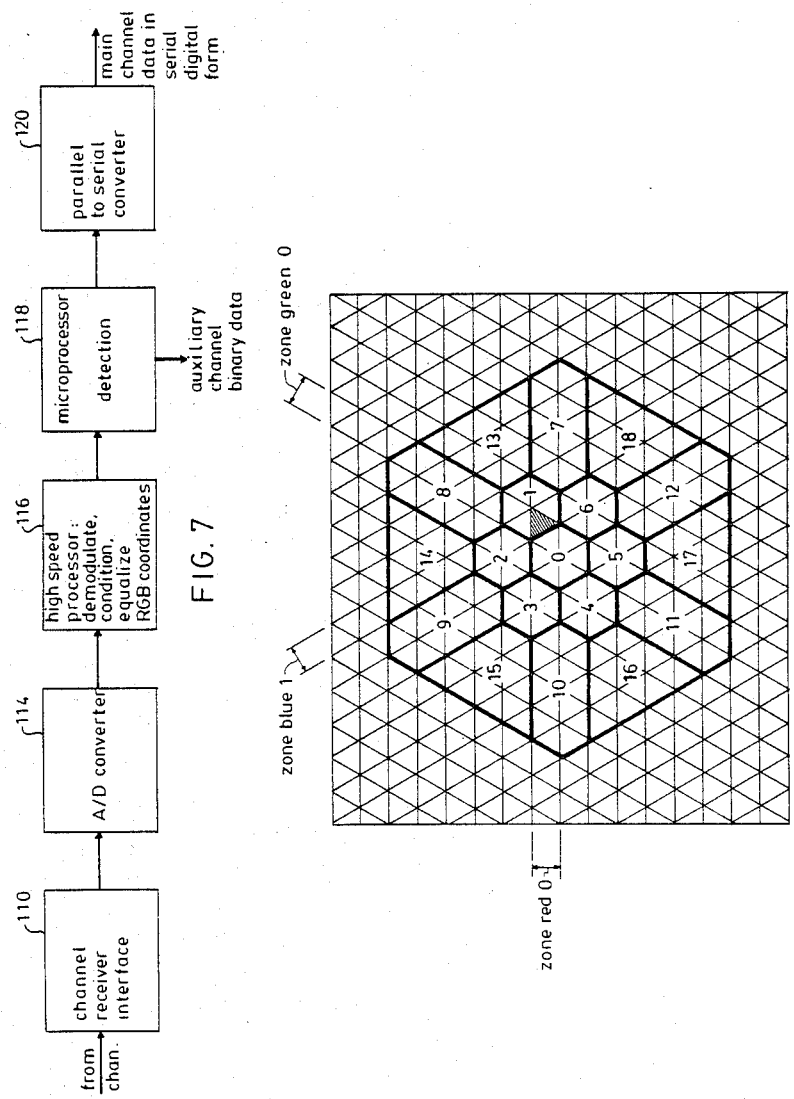
Figure 8:
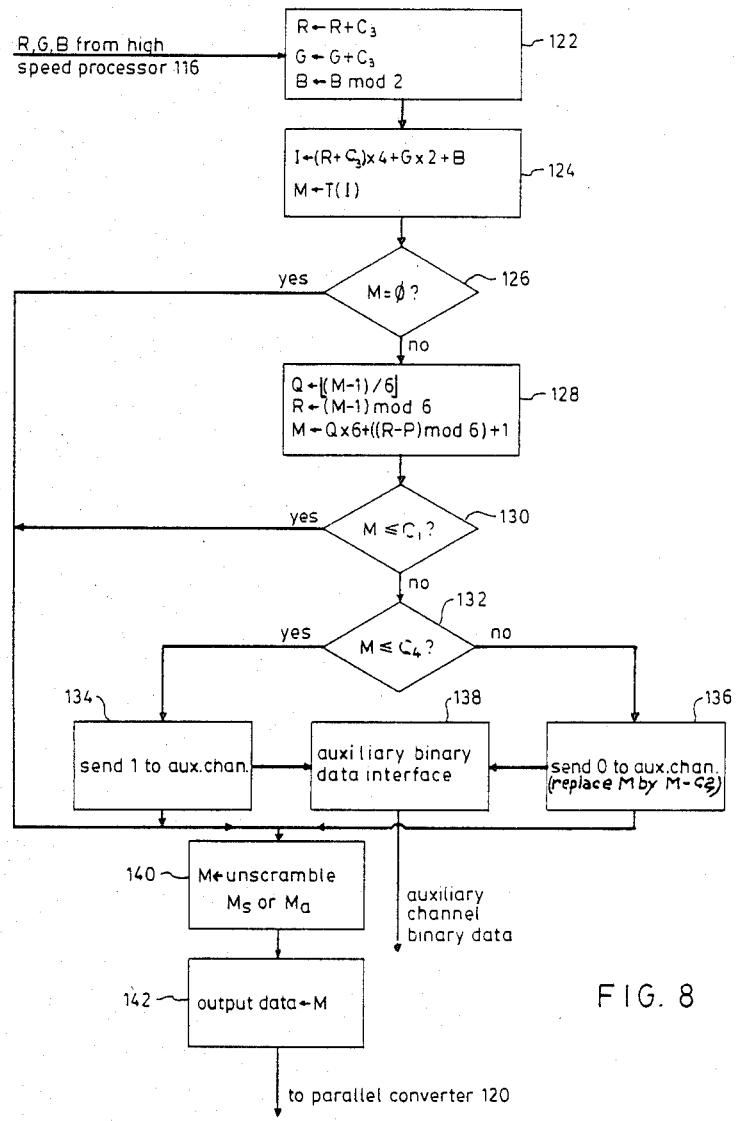

In the drawings which illustrate a preferred embodiment of the invention:

FIG. 1 is a schematic diagram having blocks referring to the functional requirements of a transmitter and a receiver for employment with the invention, FIGS. 2a-2h show prior art message points mapped on a rectangular grid in the two dimensional Cartesian plane, FIGS. 3a-3f show prior art message points mapped (largely) on a triangular grid in the two dimensional Cartesian plane. (It should be noted that other message point distributions are known such as those described and compared in an article, "Digital Amplitude-Phase Keying with M-ary Alphabets" by Thomas, Weidner and Durrani, IEEE Transactions on Communications, Vol. COM-22, No. 2, February 1974), FIGS. 4a-4j show signal structures of the invention mapped on the Cartesian plane, FIG. 5 is a schematic block diagram of the transmission end of a communications link including a signal processor, FIG. 6 is a flow chart showing the operations of the signal processor and microprocessor of FIG. 5, FIG. 7 is a schematic block diagram of the receiver end of a communications link including a signal processor, and microprocessor, FIG. 8 is a flow chart showing the operations of the signal processor and microprocessor of FIG. 7, and FIG. 9 shows the decision areas for received signals which were encoded in accord with the distribution of FIG. 4c.

FIG. 1 schematically illustrates functional operations performed in a communications systems which would utilize the invention. The functional operations are not intended to imply particular hardware or choices between analog vs. digital modes, or hardware vs. software modes at any particular stage.

Thus as functionally illustrated in FIG. 1 where, functionally, serial binary data is converted, at a serial to parallel converter, into groups of n digits. Such groups of n digits are encoded to provide the message point Cartesian coordinates for QCM modulation. A coordinate signal generator and a carrier generator provide the signals to create the modulated carriers which are combined and transmitted over the channel. At the receiver the received signal is demodulated, conditioned and equalized and sent to the decision region selection device which makes the decision as to the message point coordinates. Such "decision coordinates" are supplied to the decoder which converts these coordinates into parallel data intended to correspond to the parallel data entered at the transmitter. The received parallel data is converted into serial data for transmission to the user. Circuitry for performing the above functions is well known to those skilled in the art and examples are disclosed in the Canadian and U.S. patents referred to. Applicant's circuitry (the preferred form of which is discussed hereafter) provides a novel relationship between the n binary digit groups and the message points, less vulnerable to noise and phase jitter, and error and which allows symmetry, suppression of carrier and, in one alternative, the ability to transmit auxiliary information. Applicant's preferred embodiment also reflects the advances in technology since the dates of the Canadian and U.S. patents referred to.

There is here discussed the relationship of the message point coordinates to the encoded binary information. In contrast with the prior art the total number of message points K employed in a signal structure that is in accord with the invention will not be an integral power of 2 such as 8, 16, 32, etc., even though the number of bits to be transmitted per Cartesian coordinate pair is an integer n requiring at most $M=2^n$ message points. In fact the value of K will always exceed the value of M. In a simple embodiment of the invention at least one of the required M values will be identified with more than one of the K message points of the signal structure.

The reasons behind the selection of $K>M$ are firstly, that the total number of points lying on concentric rings is not a power of 2 for either of our type A or B structures, secondly, we desire the carrier signal be suppressed which is accomplished when the centre of the concentric rings is the centroid (centre of gravity) of the K signal points, and thirdly, we will desire to have 60° symmetry for type A structures and 120° symmetry for type B structures when we anticipate the use of differential encoding in conjunction with these signal structures. By 'A type structures' we refer to an arrangement of message points having 60° symmetry and a point at the origin, thus in the optimum arrangement $K=6I+1$ where I is any integer and is exemplified by FIGS. 4(a) (c) (e) (g) (i). (It will be noted that 60° (hexagonal) symmetry can be achieved and near optimum arrangement, by omitting the origin point so that $K=6I$. However, discussions of the preferred embodiment refer to $K=6I+1$ arrangements.) By 'B type structures' we refer to 120° symmetry with no points at the origin and $K=3I$ as exemplified by FIGS. 4(b)(d)(f)(h)(j).

Note that differential encoding is very desirable since techniques which derive a carrier from the received data signal, the carrier being fully suppressed, are generally ambiguous in phase and when there is substantial 60° or 120° symmetry of the signal structure there can be 60° or 120° ambiguity in the recovered carrier.

With differential encoding, information is transmitted in terms of the possible transitions from past transmitted signal points to now transmitted signal points. In our case, with $K>M$, there are K possible transitions and at least two different transitions can convey the same information.

Leaving aside likely use of differential encoding and decoding, consider the signal structure shown in FIG. 4a which has a total of $K=13$ signal points and where the locations of the seven innermost points are shown by solid dots and six outer points are marked with small circles. In this case we presume that M=8 and that 7 of the M points are to be associated with the inner 7 points and the eighth of the M points will be associated with any of the outmost 6 points. Indeed, in successive occurrences of the need to transmit the 8th of the M points the 6 outer points will be used in turn so that each will occur with a frequency that is 1/6 of the frequency of each of the 7 inner points. Thus when calculating the signal energy only one outer point need be included in the calculation. (The 6 outer points may be used in turn in cyclic order but for many applications the 6 outer points will be used in a pseudo random manner due to the differential encoding).

Signal sets can be compared on the basis of the average required energy, under the assumption that in each set the minimum distance between points in the set is 2 units in each case and further the rectangular system points are assumed to have integral coordinates. A lower average energy for a given minimum separation results in an improved signal to noise performance.

As a result the average energy E, for the signal structure shown in FIG. 4a will have the value 4.5 versus, for example a value of 5.5 for the prior art structure of FIG. 2b where each signal point is chosen from a rectangular grid and each signal point is assumed to occur with the same frequency.

In other figures such as FIG. 4c the situation is slightly more complicated. Here there are a total of K=19 points and we assume M=16. In this case a chosen 3 of the M values will each be associated with pairs of the six outer points. Each of the paired outer points will be used in turn so that outer points will occur with $\frac{1}{2}$ the frequency that inner points occur, (in one alternate of the preferred embodiment the selection of alternates will be in accord with auxiliary channel binary signals). Thus only 3 of the six outer points will enter into the energy calculation giving the result E=9. In contrast the 16 point signal structure of FIG. 2d results in E=10 and the structure of FIG. 2c in E=13.5.

Although use of the invention provides for a "good" selection of signal points, differential encoding becomes more complex as does the detection and decoding processes. In the Type A and Type B codes it is advantageous to use the extra message points in a statistically equal manner that preserves the 120° and 60° symmetries respectively required. In accord with preferred techniques using the invention, it may be noted that differential encoding may be used to provide the statistically equal usage. In the preferred embodiment, the extra message points are selected on a basis that provides an extra signalling channel.

Type A codes present with regard to differential encoding a complication since there is no angle associated with the central point. This case can be treated by "remembering" in the encoder the last signal point that was not a central point that was transmitted, whenever a central point is transmitted.

There is also an advantage that can be derived when K>M. It is possible, through varying the pattern of the statistically equal usage of the extra points, to transmit auxiliary information. This ability can be enhanced by deliberately increasing K over the minimum value that would be necessary to provide symmetry.

It should be noted that the extra points need not be chosen entirely or partly from an outer ring but can be any of the K points. However, to minimize average energy requirements, points which are less frequently used should be outer rather than inner points.

It should be noted that none of the prior art of FIGS. 2 and FIGS. 3 employ signal points at the centre of the signal structure and none employ extra signal points.

In summary as greater data transmission rates are employed over telephone channels it becomes more and more important to utilize better performing signal structures even although they are more complex to implement.

In FIG. 5 it is shown that a series of binary signals, for transmission along the communications link, are sent to the circuitry along line 10 to a serial-to-parallel converter 12 which converts the information into output bauds of n binary digits. After processing in the microprocessor 14 and high speed processor 16 as discussed in connection with FIG. 6, the resultant signals are converted at digital-to-analogue converter 17 for the transmitter channel interface and transmission along the channel.

The apparatus and procedures of FIGS. 5 and 6 are operable with n bits per baud where n is 2 or greater. FIGS. 4a, 4c, 4e, 4g and 4i represent message point distributions which may be achieved with the apparatus and methods of FIGS. 5 and 6 for n=3,4,5,6 and 7 respectively.

The processors 14 and 16 and the flow chart of FIG. 6 are more easily discussed in detail using a specific value of bits per baud. Before commencing such description it is desired to set out certain constant values C1, C2, C3, C4, for n bits/baud where n=4,5,6 or 7. The usage of these constant values will be discussed hereafter.

Thus the table below gives values for use of the preferred processors and the flow chart of FIG. 6 for n=4,5,6 and 7.

| n (bits/ baud) | M | C1 | C2 | C3 | C4 | K | (message points) | Shown in FIGURE |
|---|---|---|---|---|---|---|---|---|
| 4 | 16 | 12 | 3 | 6 | 15 | 19 | | 4c |
| 5 | 32 | 26 | 5 | 8 | 31 | 37 | | 4e |
| 6 | 64 | 54 | 9 | 10 | 63 | 73 | | 4g |
| 7 | 128 | 116 | 11 | 14 | 127 | 139 | | 4i |

FIGS. 5 and 6 will now be described where n is selected as 4 bits/baud. The 4 bits in each baud are provided to the register 20 of a microprocesor 14.

It may be here noted that for bauds of four bits, $2^n=16$ that is each baud or group represents one of 16 possible values. It should also be noted that the lowest value for K hexagonally arranged message points ($K \geq 2^n$) is 19 where there is a point at the origin and 60° symmetry (See FIG. 4c). With K=19 and $2^n=16$ it will be noted that 13 of the $2^n$ possible baud or group values may be a class in one-to-one correspondence with message points while the remaining 3 of the baud values outside the class will each correspond to two of the K message points, making up a total of 19. In FIG. 4c the 13 solid ones of the message points are those in one-to-one correspondence with a class of values consisting of a corresponding number of baud or group values while the 6 message points which are outlined only, comprise 3 pairs with each pair corresponding to one of the remaining 3 of the baud or group values.

FIG. 6 is a flow chart showing the operations of microprocessor 14 and high speed processor 16.

The four bits in the register 20 of FIG. 6 represent a number M, the baud or group value of which may have 16 values from 0-15. These bits are scrambled at 22 to produce another 4 bit value Ms in accord with well known techniques. Although such scrambler is commonly a hardware device, we prefer to use the available capacity of the microprocessor. The output of the scrambling provides at Register 24 Ms, a scrambled binary number having $2^n$ group values 0-15.

C1 is 12, and 13 (counting the zero position) is the number of the $2^n$ group values in one-to-one correspondence to a message point.

The decision block 26 determines whether Ms is $\leq 12$ (i.e. whether it is in one-to-one correspondence with a message point). If this is so the number Ms is supplied directly to decision block 36.

At decision block 26 if Ms > 12 then each group value of Ms will correspond to a pair of alternate message points. For Ms > 12, Ms is supplied to the "auxiliary channel enabled" block 28. When it is desired to use the Auxiliary Channel a switch (not shown) will usually enable the channel between blocks 30 and 31 and provide a signal 'Auxiliary Channel enabled' to decision block 28.

Data to be sent to the auxiliary channel is supplied to storage 31 where it is retained in a queue for transmission in single bits when the auxiliary channel becomes available. It is not relevant to the present description whether the auxiliary data is related to the main data sent along line 10 or completely independent.

If no data is to be sent from the Auxiliary data queue i.e. the Auxiliary Channel is not enabled, then the number Ms is supplied to block 36. If auxiliary data is to be sent the Auxiliary Channel is enabled and a signal is sent to block 30 causing it to receive and acknowledge the 1 or 0 which is the 'first-in-line' of the queued bits in Auxiliary Data Queue 31. (Auxiliary Data Queue 31 is designed to receive binary data and to retain it in a queue and to supply it bit by bit to operator block 30. The auxiliary binary data may represent any binary data whether independent, related to the main channel data or to the transmission). The receipt by block 30 of the bit is acknowledged to block 31 to ready the next bit in the queue for subsequent transmission. By arbitrary convention it is decided that a "1" on the auxiliary channel will not change Ms while a 0 on the auxiliary channel will require a change. Accordingly, if a "1" is present the decision block 32 sends the number Ms unchanged to block 36. If the auxiliary channel digit is a "0" then the number C2 (here 3) is added to Ms. The new Ma=Ms+3 is supplied to decision block 36. Note that where the auxiliary channel is disabled the transmitted data is equivalent to a constant binary 1. Note also that Ma can exceed the range 0 to $2^n-1$ and hence requires an additional bit in its representation.

Decision block 36 is inserted since differential encoding is to be used to avoid the effects of phase ambiguities during transmission and because logic is simplified if such differential encoding is not carried out for Ms=0. Accordingly, decision block 36, if Ms=0 sends Ms forward to block 38. If Ms≠0 (and Ma≠0) Ms or Ma as the case may be is transmitted to block 40 for conversion to coordinates defining the hexagonal message points.

Thus, for example in FIG. 4c the values of Ms have been assigned to the message points 0-12. While the assignment of a value for Ms to a message point could be arbitrary, the assignment is here chosen to agree with the logic used in FIG. 5 where the lower Ms values (0-12) in one-to-one correspondence with message points are assigned to message points on inner rings. As will be noted, in the outer ring two message points (shown in outline only) correspond to each Ms value from 13-15. For Ms > 12 a "1" from Auxiliary Data Queue 15 leaves the number Ms unchanged at 13, 14 or 15 while for a "0" from Queue 15 the number Ms will be augmented by 3 (C2) to be 16, 17 or 18. The message points for 16, 17, 18 are therefore one set of message points 13,14,15. FIG. 4c also shows sector divisions, Section 0, Sector 1 etc. After conversion at block 40 the message points are designated by sector and a number (1, 2 or 3 therein). Thus for the first two sectors in FIG. 4c the conversion will be:

| Ms or Ma | R(Sector) | Q(No. in Sector) |
| --- | --- | --- |
| 1 | 0 | 0 |
| 7 | 0 | 1 |
| 13 | 0 | 2 |
| 2 | 1 | 0 |
| 8 | 1 | 1 |
| 14 | 1 | 2 | and so on, and where R is the sector number and Q is the position in the sector. Differential encoding is used so that a sector error in transmission will have no effect after 2 bauds.

Operations Block 40 achieves:

Q←[(M−1)/6] determining a number corresponding to the position of the signal point in the sector (where Q is the integral part of the quotient (M−1)/6)

R←(M−1) mod 6-determining the sector number

P←(P+R) mod 6-where P is the sector number from the previous baud and $M_D$←QX6+P+1-giving a unique designation of the message point.

In fact, of the operations designated in box 40 a look up table is used to obtain the values QX6+1 and R. P (where $0 \leq P < 6$) is the sector number from the previous baud, allowing the calculation P←(P+R) mod 6.

It will be noted that, due to the differential encoding techniques used the sector locations of the message points are signalled as transitions from one sector to the next, for reconversion to locations at the receiver. In general reference in the application and claims herein such signalling of transitions is considered as a signalling of locations since this is the information ultimately conveyed.

Accordingly, the number $M_D$ from block 40 (or Ms=0 from 36) is applied to look up table 38 to produce the X(M), Y(M) being the coordinates of the differentially encoded message points for transmission. The X(M), Y(M) coordinates define message points which correspond to the intended 60° symmetry and spatial distribution. That is X(M), Y(M) for P=0 will have counterpart points in the same relative position within the sector for P=1, 2,3,4 or 5 and the outer points in a sector will correspond to higher values of M.

The message points X(M), Y(M) may be converted to analogue values and modulated on a carrier in the manner of the DSB-QCM systems shown in Canadian Pat. No. 985,376 and U.S. Pat. No. 3,955,141 heretofore referred to. However, it is preferred, in the signal processor of the preferred embodiment to calculate the values for the modulated 'in phase' and 'quadrature phase' carriers and convert the result in digital-to-analogue converter 17 for transmission on the communications link.

It will be noted that all operations and decisions depicted in FIG. 6 may equally be performed by hardware. However, cost and space limitations at this time suggest the programming shown as the best mode.

Transmission on the transmission or communications link takes place to the receiver shown in FIG. 7.

It is now proposed to discuss the receiver in accord with the invention. Before doing this it is noted that (excluding the reference to the inventive message point distribution), it is well known to provide receivers to convert message point coordinates modulated on a QCM channel to provide the encoded binary information from the transmitted coordinates. This is evidenced by the receiver designs disclosed in U.S. Pat. No. 3,955,141 and Canadian Pat. No. 985,356.

It is proposed to discuss the receiver of this invention operating with the novel message point arrangement here proposed.

In FIG. 7 signals received along the communications channel at interface 110 are supplied to A/D converter 114 for conversion to digital signals. These digital signals are supplied to high speed signal processor 116 where the signals are treated to provide demodulation, equalization etc., in accord with well known techniques. Although it is within the scope of the invention for signal processor 116 to provide signals of the encoded Cartesian coordinates for later conversion into binary data, in this invention it is found preferable, because of the triangular grid distribution of the message points, to provide zones (referred to as RGB coordinates in FIG. 7) in triangular coordinates to a microprocessor 118 for detection as to the value of the n bit bauds or group transmitted. The values of the n bit bauds or groups transmitted are then converted from parallel to serial form in converter 120. The microprocessor 118, as hereinafter explained, also extracts the auxiliary channel data as part of its operation.

In the high speed signal processor 116 demodulation, equalization and conditioning are performed in a manner well known to those skilled in the art.

The high speed signal processor 116 might have been designed in accord with conventional techniques, as in the apparatus in the Canadian and U.S. patents referred to, to convert the quadrature code signals into Cartesian values. However the signal processor, in accord with the invention is designed to convert by a simple conversion formula Cartesian coordinates into coordinates at 0°, 60° and 120° clockwise from the Y axis (called Red, Blue, Green, respectively) with each coordinate representing a zone being the area between adjacent triangular grid lines perpendicular to the respective Red, Blue or Green axes. FIG. 9 shows the decision areas, defined by the decision boundary lines, corresponding to the message points of FIG. 4c. A result from the high speed signal processor 116 that the coordinates received defined in the areas corresponding to zones Red 0, Green 0 and Blue 1 is indicated on FIG. 9 as the shaded triangle of FIG. 9 and one which the decision apparatus (in the microprocessor) will decide is message point 1. It will also be noted that since it is zones rather than lines which are defined, only the integral part of the converted Red, Green, Blue values need be transmitted to the microprocessor. It will further be noted that once any two of the zones are defined—here Red 0 and Green 0—the only remaining ambiguity is between the two triangles comprising the rhombus defined by the red and green zones so that the Blue information may be confined to whether it is even or odd. This Red-Blue-Green information is provided to the microprocessor.

The information provided to the microprocessor as indicated in box 122 of FIG. 8 is (Red Zone No.+C3) X4 (C3=6 in the version using the message points of FIG. 4c) Green Zone No.+C3 and Blue Zone No. mod 2 (i.e. whether blue is even or odd).

The result is combined in box 124 to provide the number I which, in the microprocessor may be used in a look up table to get the message point value M. For M=0, the number is supplied directly to the unscrambler. For M·0 box 128 performs the operations indicated to perform the differential de-encoding. The decoded M, corresponding to Ms or Ma at the transmitter, is applied to decision box 130. For $M \leq C1$ (here C1=12) no auxiliary data is signalled and the Ms value is supplied to the unscrambler 140. For M>C1 the decision is made at 132 whether $M \leq C4$ (here 15). If $M \leq C4$ then a binary 1 is sent to the auxiliary binary data interface (or channel) indicated at 138. If M<C4 then a binary 0 is sent to the auxiliary binary data interface or channel and M is reduced by C2. On either decision at block 132 the value Ms or Ma is supplied to the unscrambler 140 to provide the value M for the parallel to serial converter 120. The unscrambler 140 of course reverses the scrambling performed at the scrambler 22 of the transmitter so that the original information is recovered.

As previously stated the table previously set out for 4–7 bits/baud covers the values of M, K (message point), C1, C2, C3 and C4.

It will be noted that although the drawings show a single transmitter at one end of a transmission link and a single receiver at the other, that in fact each end of the link will customarily include a transmitter and receiver in the form of a MODEM for two way transmission. Thus the high speed processor at the transmitter will typically be the same one acting, at the same end as the high speed processor of the receiver.

Figure 4I:
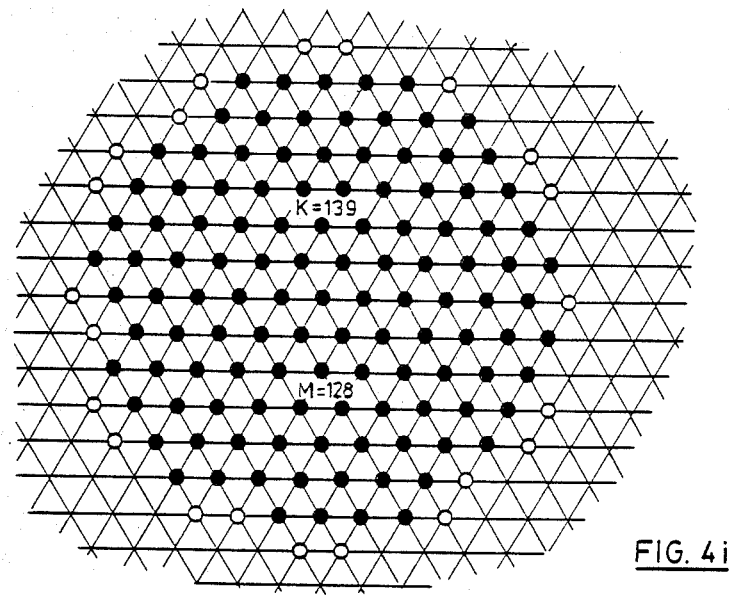
Figure 4J:
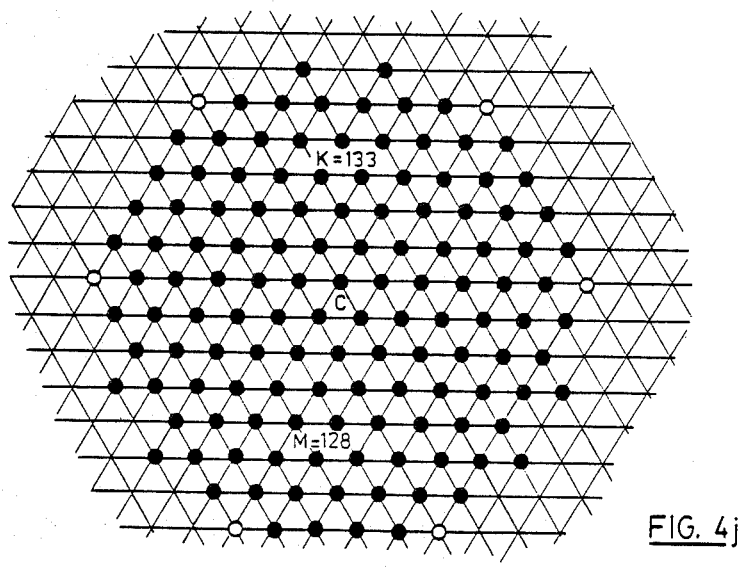

It will be noted that the paired message points (those shown in outline only) for the alternatives in FIGS. 4e and 4i do not themselves display 60° symmetry (although the collection of points as a whole does). However, this lack of 60° symmetry in the paired points does not affect the 60° symmetry *so far as transmission is concerned* because of the effect of the differential encoding.

The specific embodiment deals with the use of the excess $K - 2^n$ points for signalling or providing an auxiliary channel. As stated earlier the points may be used for other purposes, for example merely to achieve lower frequency use of outer message points requiring higher signalling power. Statistically even distribution is achieved to approximate symmetry and elimination of carrier because of the differential encoding.

The examples in FIGS. 4a, c, e, g, i, show message point distributions on a regular triangular grid having 60° symmetry.

The examples in FIGS. 4b, d, f, h, j, show message point distributions on a regular triangular grid having 120° symmetry. Although such symmetry may not be as advantageous as 60° symmetry it does provide the advantages of the invention accuring from the superiority of use of points on a triangular grid and the provision of $K > 2^n$ points.

These message points distributed as illustrated in FIGS. 4b, 4d, 4f, 4h, 4j, show distributions having only 120° symmetry and no point at the origin but having the advantages discussed for signals representing the coordinates on an equilateral triangular grid for $K>2^n$. On the Figures last listed $M=2^n$ is set out as well as K.

It will be appreciated that it is well within the abilities of those skilled in the art to convert binary signals in groups of n into the coordinates of the message points illustrated in FIGS. 4b, 4d, 4f, 4h, 4j; and at the receiver to convert them back to the binary digits encoded all in accord with the techniques discussed herein.

These distributions differ in that special consideration of the point of origin may be omitted and that there are only three sectors in place of six and therefore modulo three calculations should replace the modulo six calculations.

I claim:

1. Means for providing QCM signals to a transmission link, comprising:
   means for receiving binary signals,
   means for converting groups corresponding to n of such binary signals having $2^n$ possible group values into signals represent a set of K signal message points each defined by Cartesian coordinate pairs where $K>2^n$, the signal message points being substantially located at intersections on a regular equilateral triangular grid,
   where each message point corresponds to only one group value of the $2^n$ possible values, and at least one of the $2^n$ possible values corresponds to at least two message points,
   said converting means including means responsive to one of said at least one possible values for selecting at different times different ones of said at least two corresponding message points,
   said converting means being designed, responsive to a continuing random sequence of said binary signals, to utilize each of said K message points and to select message points corresponding to the at least one of the values, to substantially reduce the carrier component in said QCM signals,
   means responsive to said message point signals for providing a pair of quadrature carriers respectively modulated in accord with the coordinates of said signal message points.

2. Means as claimed in claim 1 where said K message points are arranged substantially in 120° symmetry.

3. Means as claimed in claim 1 where said K message points are arranged substantially in 60° symmetry.

4. Means as claimed in claim 1 where $K-2(K-2^n)$ of the group values are in one-to-one correspondence with signal message points.

5. Means as claimed in claim 2 where $K-2(K-2^n)$ of the group values are in one-to-one correspondence with signal message points.

6. Means as claimed in claim 3 where $K-2(K-2^n)$ of the values are in one-to-one correspondence with signal message points.

7. Means as claimed in claim 1 wherein the values in a class of group values selected from such $2^n$ possible group values are each in one-to-one correspondence with a message point and where each of the group values outside said class corresponds to at least two of said message points,
   means for detecting the occurrence of a group value not included in said class,
   means responsive to such detection to determine between alternate corresponding message points, which message points coordinates are modulated on the carriers.

8. Means as claimed in claim 2 wherein each group value of a class of such $2^n$ possible group values is in one-to-one correspondence with a corresponding message point and where each of the group values outside said class corresponds to at least two message points,
   means for detecting the occurrence of groups having values outside said class,
   means responsive to such detection to determine between alternate corresponding message points which message points coordinates are modulated on the carriers.

9. Means as claimed in claim 3 wherein each group value of a class of such $2^n$ group values is in one-to-one correspondence with a corresponding one of said message points and where each of the group values outside said class corresponds to at least two of said message points,
   means for detecting the occurrence of a group having a value not included in said class,
   means responsive to such detection to determine between alternate corresponding message points which message points coordinates shall be sent.

10. Means as claimed in claim 7 wherein there are $K-2(K-2^n)$ group values in said class and each of the group values outside said class corresponds to two message points,
    means for detecting the occurrence of a group having a value outside said class,
    and means responsive to such detection to determine alternate corresponding message points which of the message point's coordinates corresponding to such value shall be modulated on the carriers.

11. Means as claimed in claim 8 wherein said first class consists of $K-2(K-2^n)$ group values and each of the group values outside said class corresponds to two message points,
    means for detecting the occurrence of one of the group values outside said class,
    and means responsive to such detection to determine which of the two message points corresponding to such group value shall be transmitted.

12. Means as claimed in claim 9 wherein there are $K-2(K-2^n)$ group values in said first class and each of the group values outside said class corresponds to two message points,
    means for detecting the occurrence of one of the group values outside said class,
    and means responsive to such detection to determine which of the two message points corresponding to such value shall be transmitted.

13. Means as claimed in claim 10 wherein auxiliary binary data is available for transmission, said means responsive to such detection being actuated in accord with the auxiliary binary data to signal a bit of auxiliary binary data by selection of one or the other of the alternate message points.

14. Means as claimed in claim 11 wherein auxiliary binary data is available for transmission, said means responsive to such detection being actuated in accord with the auxiliary binary data to signal a bit of auxiliary binary data by selection of one or the other of the alternate message points.

15. Means as claimed in claim 12 wherein auxiliary binary data is available for transmission, said means responsive to such detection being actuated in accord with the auxiliary binary data to signal a bit of auxiliary binary data by selection of one or the other of the alternate message points.

16. Means as claimed in claim 1 wherein said intersections may be considered as located on concentric rings and wherein said message points occupy substantial all available intersections on such concentric rings inward of the two outward occupied rings.

17. Means as claimed in claim 2 wherein said intersections may be considered as located on concentric rings and wherein said message points occupy substantially all available intersections on such concentric rings inward of the two outward occupied rings.

18. Means as claimed in claim 3 wherein said intersections may be considered as located on concentric rings and wherein said message points occupy substantially all available intersections on such concentric rings inward of the two outward occupied rings.

19. Means as claimed in claim 1 wherein a class of such $2^n$ possible group values is in one-to-one correspondence with a corresponding number of said K message points and where each of the group values outside said class corresponds to at least two of said message points, wherein said K message points comprise substantially all locations on concentric rings on said equilateral triangular grid inward of the two outward occupied rings, and wherein message points corresponding to group values in said class are located on concentric rings which rings are not outward of the rings containing message points corresponding to group values outside said class.

20. Means as claimed in claim 2 wherein a class of such $2^n$ group values is in one-to-one correspondence with a corresponding number of said message points and where each of the group values outside said class corresponds to at least two message points not included in said number, wherein said K message points comprise substantially all locations on said equilateral triangular grid on concentric rings inward of the two outward occupied rings, and wherein the message points corresponding to group values in said class are located on concentric rings inward of or on the same ring as message points corresponding to group values outside said class.

21. Means as claimed in claim 3 wherein a class of such $2^n$ group values is in one-to-one correspondence with a corresponding number of said message points and where each of the group values outside said class corresponds to at least two message points not included in said number, wherein said K message points comprise substantially all locations on concentric rings on said equilateral triangular grid inward of the two outward occupied rings, and wherein the message points corresponding to group values in said class are located on concentric rings inward of or on the same ring as message points corresponding to group values outside said class.

22. In a receiver for receiving QCM modulated signals wherein such modulated signals were encoded to represent the rectangular coordinates of signal points arranged at the intersection of lines on a regular equilateral triangular grid, means for deriving said rectangular coordinates from the received signal, means for converting said derived rectangular coordinates into sets of three signal values, each signal value being characteristic of a zone parallel to a different one of said triangular grid directions.

23. In a receiver as claimed in claim 22 including means for converting said set of three zone values into a group of binary digits.

24. Means for providing QCM signals to a transmission link, comprising:

means for receiving binary signals, means for converting groups corresponding to n of such binary signals having $2^n$ possible group values into signals chosen from a set of K signal message points defined by Cartesian coordinate pairs where $K > 2^n$ the signal message points being substantially located at intersections or a regular equilateral triangular grid, where each message point corresponds to only one group value of the $2^n$ possible values, and each of the $2^n$ possible values corresponds to at least one message point, means for differentially encoding each of said signals representing message points other than that at the centre of said grid to produce a signal also representing one of said message points, said converting means and said differential encoding means being collectively designed, responsive to a continuing random sequence of said binary signals to utilize each of said K signal points, and to select said message points to substantially reduce the carrier component in said QCM signals, means responsive to said message point signals for providing a pair of quadrature carriers respectively modulated in accord with the coordinates of said signal message points.

25. Means as claimed in claim 24 where said K message points are arranged substantially in 120° symmetry.

26. Means as claimed in claim 24 where said K message points are arranged substantially in 60° symmetry.

27. Means as claimed in claim 24 wherein said intersections may be considered as located on concentric rings and wherein said message points occupy substantially all available intersections on such concentric rings inward of the two outward occupied rings.

28. Means as claimed in claim 25 wherein said intersections may be considered as located on concentric rings and wherein said message points occupy substantially all available intersections on such concentric rings inward of the two outward occupied rings.

29. Means as claimed in claim 26 wherein said intersections may be considered as located on concentric rings and wherein said message points occupy substantially all available intersections on such concentric rings inward of the two outward occupied rings.

30. Means as claimed in claim 25 wherein said message points other than at the centre of said grid, are divided into three similar patterns each contained in a 120° sector, where said means for differential encoding is designed and constructed so that each differentially encoded message point has the same position in a sector as before differential encoding; and the sector number is the sum, modulo 3, of the sector numbers of the message point before differential encoding and of the previous message point after differential encoding.

31. Means as claimed in claim 26 wherein said message points, other than at the centre of said grid, are divided into six similar patterns each contained in a 60° sector, where said means for differential encoding is designed and constructed so that each differentially encoded message point has the same position in a sector as before differential encoding; and the sector number is the sum, modulo 6, of the sector numbers of the message point before differential encoding and of the previous message point after differential encoding.

* * * * *